(12) United States Patent
Naughton et al.

(10) Patent No.: US 11,054,168 B2
(45) Date of Patent: Jul. 6, 2021

(54) DIFFUSER PATTERNING

(71) Applicant: Advanced Technology Environmental Control Systems, Inc., Concord, CA (US)

(72) Inventors: Bart J. Naughton, Alamo, CA (US); Brian J. Landsberger, Las Vegas, NV (US)

(73) Assignee: Advanced Technology Environmental Control Systems, Inc., Concord, CA (US)

( * ) Notice: Subject to any disclaimer, the term of this patent is extended or adjusted under 35 U.S.C. 154(b) by 97 days.

(21) Appl. No.: 16/001,879

(22) Filed: Jun. 6, 2018

(65) Prior Publication Data

US 2018/0356119 A1 Dec. 13, 2018

Related U.S. Application Data

(60) Provisional application No. 62/516,885, filed on Jun. 8, 2017.

(51) Int. Cl.
| | |
|---|---|
| *B01L 1/04* | (2006.01) |
| *F24F 13/068* | (2006.01) |
| *B01D 46/10* | (2006.01) |
| *B01D 46/12* | (2006.01) |
| *F24F 13/06* | (2006.01) |
| *F24F 3/167* | (2021.01) |
| *E04B 9/02* | (2006.01) |
| *E04B 9/04* | (2006.01) |

(52) U.S. Cl.
CPC .......... *F24F 13/068* (2013.01); *B01D 46/103* (2013.01); *B01D 46/12* (2013.01); *F24F 3/167* (2021.01); *F24F 13/06* (2013.01); *E04B 9/02* (2013.01); *E04B 9/0478* (2013.01)

(58) Field of Classification Search
CPC ...... F24F 13/068; F24F 3/161; B01D 46/103; B01D 46/12; F04B 9/02
USPC ......................................................... 454/187
See application file for complete search history.

(56) References Cited

U.S. PATENT DOCUMENTS

| | | | |
|---|---|---|---|
| 3,505,989 A | 4/1970 | Truhan | |
| 3,730,072 A * | 5/1973 | Soderlund | F24F 13/10 454/298 |
| 3,776,121 A | 12/1973 | Truhan | |
| 4,009,647 A | 3/1977 | Howorth | |

(Continued)

FOREIGN PATENT DOCUMENTS

| | | |
|---|---|---|
| EP | 0844147 | 5/1998 |
| JP | 60-50329 | 3/1985 |

(Continued)

*Primary Examiner* — Helena Kosanovic
(74) *Attorney, Agent, or Firm* — Shewchuk IP Services, LLC; Jeffrey D. Shewchuk (57) ABSTRACT

An air diffuser includes a mask plate spaced upstream from an orifice plate in a generally parallel relationship. The orifice plate includes openings in a first zone arranged in a non-linear pattern, inside a second zone arranged in a linear pattern. Both zones can be within a peripheral wall defining the spacing between the mask plate and the orifice plate. The mask plate has a large opening for air, with a footprint slightly larger than the first zone. The density and zone arrangement of the mask plate and the orifice plate results in a better umbrella pattern flow of air exiting the diffuser.

12 Claims, 7 Drawing Sheets

(56) References Cited

U.S. PATENT DOCUMENTS

| | | | |
|---|---|---|---|
| 4,077,739 A * | 3/1978 | Heilenbach | F01D 25/08 |
| | | | 415/121.2 |
| 4,137,831 A * | 2/1979 | Howorth | A61G 13/108 |
| | | | 454/187 |
| 4,531,956 A | 7/1985 | Howorth | |
| 5,192,348 A | 3/1993 | Ludwig | |
| 5,275,729 A | 1/1994 | Gris | |
| 5,318,474 A * | 6/1994 | Klassen | F24F 13/068 |
| | | | 454/296 |
| 5,437,701 A | 8/1995 | Townsley | |
| 5,486,088 A | 11/1996 | Brandon | |
| 5,573,811 A | 11/1996 | Townsley | |
| 5,725,427 A | 3/1998 | Koerber | |
| 5,753,191 A | 5/1998 | Yamamoto et al. | |
| 5,779,534 A | 7/1998 | Kunec | |
| 5,922,096 A | 7/1999 | Stemmer | |
| 5,968,373 A | 10/1999 | Choi | |
| 6,059,655 A | 5/2000 | Koerber | |
| 6,089,598 A | 7/2000 | Snyder et al. | |
| 6,139,426 A * | 10/2000 | Koerber | F24F 13/068 |
| | | | 454/284 |
| 6,264,551 B1 * | 7/2001 | Smith | F24F 13/068 |
| | | | 454/245 |
| 6,425,821 B1 | 7/2002 | Koerber et al. | |
| 6,656,243 B2 | 12/2003 | Hodge | |
| 6,942,563 B2 | 9/2005 | Pesch et al. | |
| 7,597,617 B2 * | 10/2009 | Solberg | F24F 13/068 |
| | | | 454/187 |
| 2004/0198215 A1 | 10/2004 | Bridenne et al. | |

FOREIGN PATENT DOCUMENTS

| | | |
|---|---|---|
| JP | 63-176943 | 7/1988 |
| JP | 2000046409 A | 2/2000 |
| WO | 2008109017 A1 | 9/2008 |

* cited by examiner

DIFFUSER PATTERNING

CROSS-REFERENCE TO RELATED APPLICATION(S)

The present application claims priority from Provisional Application No. 62/516,885, filed Jun. 8, 2017 and entitled "Diffuser Patterning". The contents of U.S. provisional patent application Ser. No. 62/516,885 are hereby incorporated by reference in entirety.

FIELD/BACKGROUND OF THE INVENTION

The present invention relates to air flow diffusers used to control or affect the flow of air from a duct into a room. The purpose of air flow diffusers is frequently to spread the air flow out of the duct to encompass the entire volume of the room. In some circumstances, the air flow diffusers may be placed in the ceiling with air flow coming out of the ceiling. The ceiling mounted diffuser is intended to direct the air flow out of the duct so it spreads across the ceiling and then proceeds vertically downward at a generally uniform rate throughout the entire area of the room. In other circumstances, the air flow diffusers may be placed in one wall of the room with air flow coming out of that wall, in which case the wall mounted diffuser directs air flow to spread across the wall and then proceed horizontally across the room.

Such diffusers have one or more plates which define one or more orifices through which the air flows. The invention is an improvement to the diffuser shown in U.S. Pat. No. 7,597,617 to Solberg et al. (including one of the present inventors), incorporated by reference. The '617 patent disclosed a diffuser with four different zones, each having a different amount of open area, to result in the desired diffused air flow therethrough. A different Multiple Stage Airflow Diffuser Apparatus For Paint Booth is disclosed in U.S. Pat. No. 5,779,534, also incorporated by reference for its general teachings of one use of an airflow diffuser.

Better geometric configurations of diffusers are needed to create more efficient forced air flows in rooms of buildings. The diffusers should be low in manufacturing cost, while still achieving a rugged design that will consistently create the desired air flows over various operating conditions and years of use. The diffusers should be easy to correctly install and simple to operate.

BRIEF SUMMARY OF THE INVENTION

The present invention is an air diffuser for controlling and spreading the flow of air where it enters the room. In one aspect, the diffuser includes a mask plate spaced upstream from an orifice plate in a generally parallel relationship. The mask plate includes a large opening for air. The orifice plate has several different zones of orifice plate openings, including orifice plate openings at a first zone density defined within a footprint of the mask plate air flow opening, and orifice plate openings at a second zone density defined outside the footprint of the mask plate air flow opening. The orifice plate further includes a peripheral wall, angled relative to the mask plate and orifice plate and extending from the mask plate to the orifice plate, with a plurality of peripheral wall openings defined therein. In another aspect, the plurality of orifice plate openings at the first zone density are arranged in a non-linear pattern, whereas the plurality of orifice plate openings at the second zone density are arranged in a linear pattern. The diffuser of the present invention results in a better umbrella pattern flow of air exiting the diffuser, including along the ceiling, wall or floor in which the diffuser is mounted, while minimizing updrafts, swirling, turbulence and deadzones over a wide range of different air flows and room geometries.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
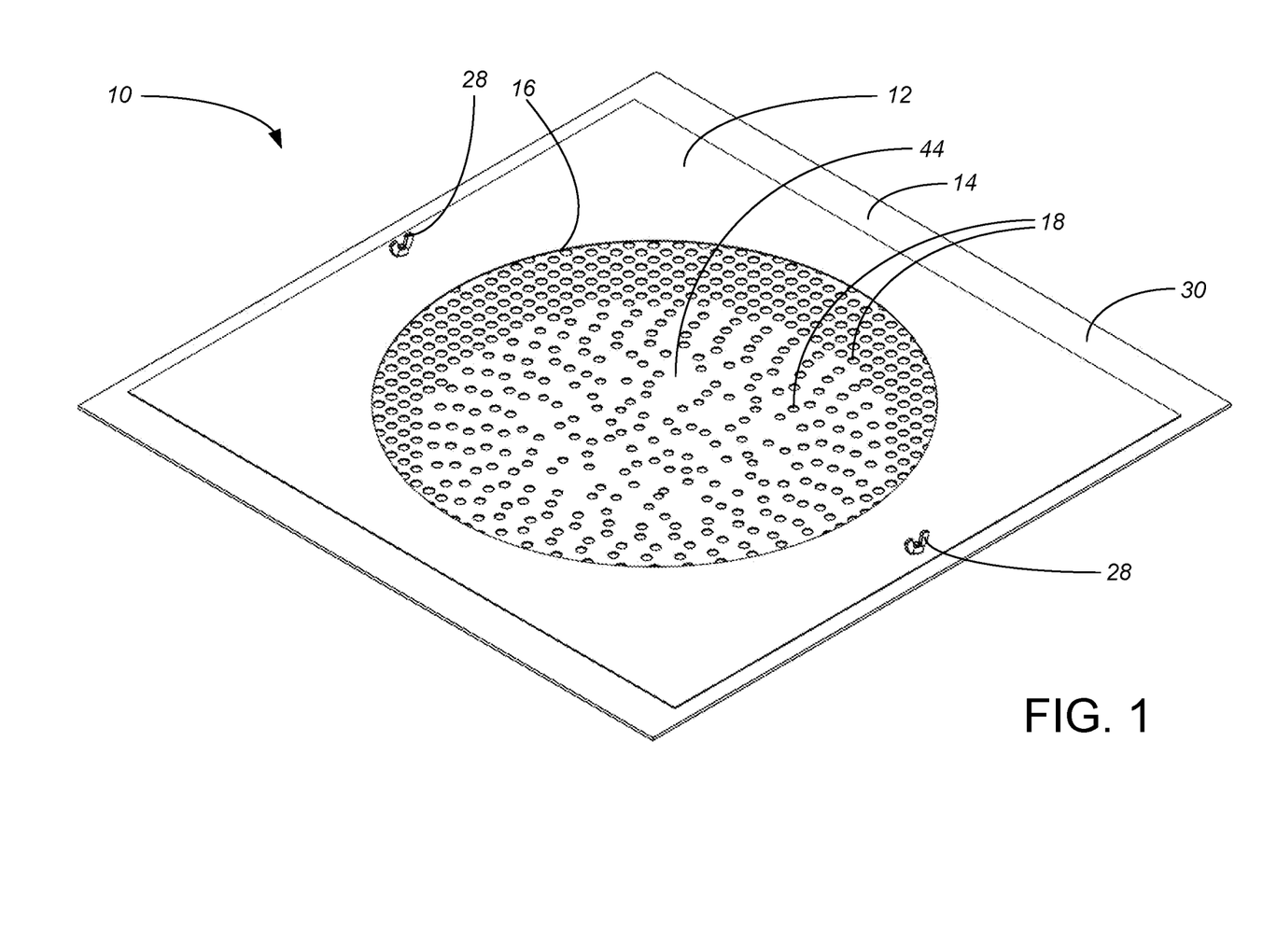
FIG. 1 is a perspective view, from above, of a first preferred embodiment of an air flow diffuser in accordance with the present invention covering a 2'×2' area.
Figure 2:
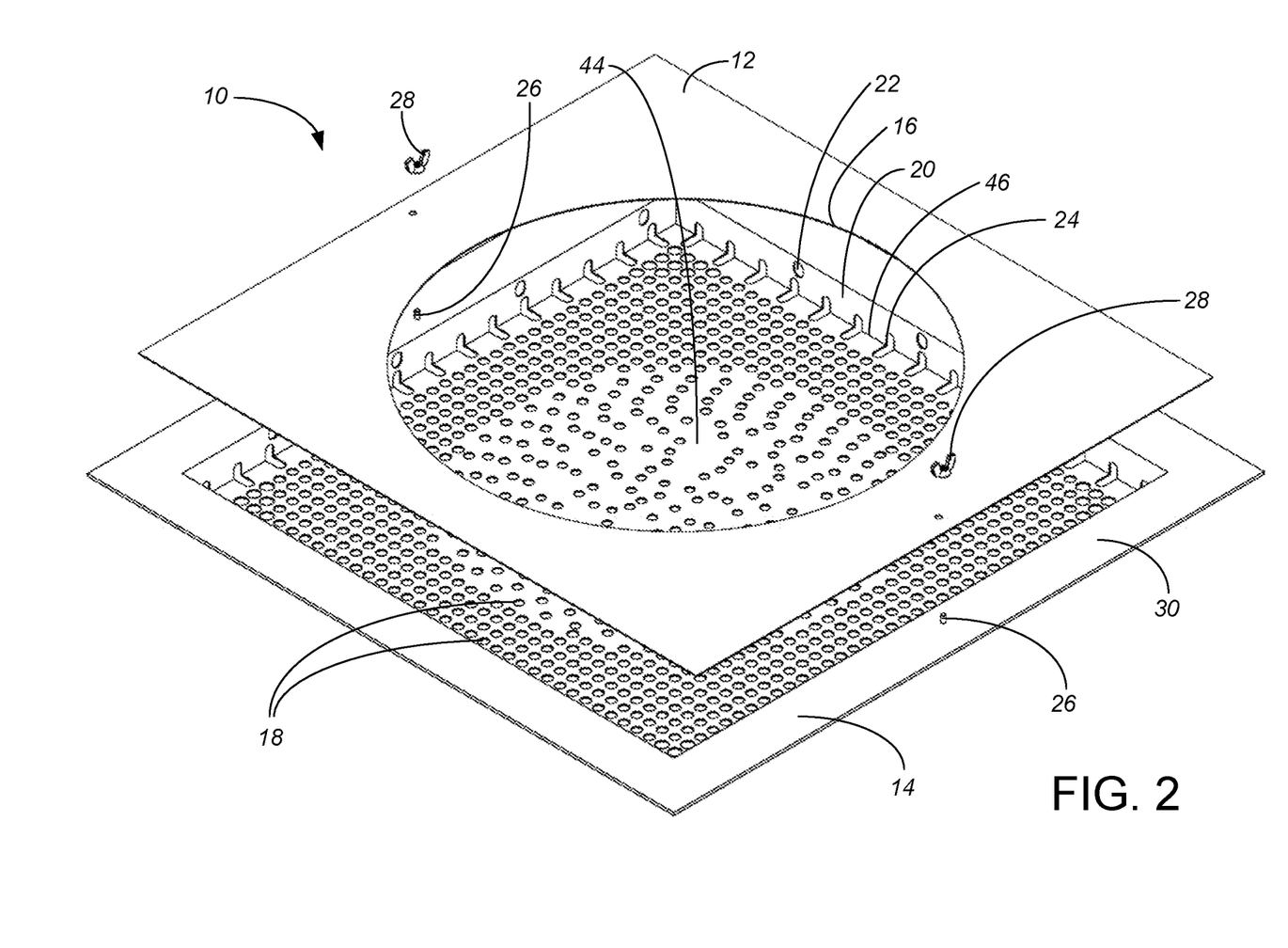
FIG. 2 is an exploded perspective view of the air flow diffuser of FIG. 1.

As best shown in FIGS. 1 and 2, a preferred air flow diffuser 10 of the present invention includes two separate air restriction elements, which are preferably formed as plates 12, 14 mounted so as to be generally parallel to each other but spaced apart. The plate which is upstream in the direction of air flow, referred to as a mask plate 12, includes a relatively large central opening 16. The downstream plate, referred to as an orifice plate 14 or a perforated plate 14, includes numerous orifices 18, all of the numerous orifices 18 being smaller than the large central opening 16 in the mask plate 12. Some of the orifices 18 are within the footprint of the mask plate central opening 16, while other orifices 18 are outside the footprint of the mask plate central opening 16.

In use, the mask plate central opening 16 creates a slight restriction and concentration of air flow, and the space between the mask plate 12 and the orifice plate 14 subsequently creates an outward, generally radial flow of air once downstream beyond the edges of the mask plate central opening 16, with a spreading axial flow of air downstream of the mask plate 12 within the central region. By using a properly sized mask plate central opening 16, the output flow through the orifice plate 14 is less affected by the speed and velocity profile of the inlet flow, Mask plates with different opening diameters, coupled with the same orifice plate 14, can be used to produce a desired umbrella-shaped output pattern over large differences in flow rate.

In some aspects, the preferred orifice plates 14 utilize the zone concepts disclosed in the orifice plates discussed in U.S. Pat. No. 7,597,617, incorporated by reference. The preferred orifice plate 14 includes a peripheral wall 20 which is angled relative to the mask plate 12 and the orifice plate 14, such as being perpendicular to the mask plate 12 and the orifice plate 14. Openings 22 in the peripheral wall 20 allow air to flow radially outward tight to the ceiling/wall/floor in which the diffuser 10 is mounted. Other edge openings 24 are provided in the orifice plate 14 extending from the plane of the orifice plate 14 into the peripheral wall 20. The preferred peripheral wall 20 shown in FIGS. 1-6 is square, but other shapes of peripheral wall including rectangular (shown in FIGS. 7 and 8), including other polygons and particularly other regular polygons such as regular hexagons or octagons, and including ovular or circular, can alternatively be used.

The mask plate 12 and the orifice plate 14 can be mounted and spaced relative to each other in any convenient fashion. In the preferred embodiment shown in FIGS. 1 and 2, two screws 26 and associated wing nuts 28 are depicted, with the planar mask plate 12 mounted in an abutting relationship to an outer or peripheral flange 30 of the orifice plate 14.

Figure 3:
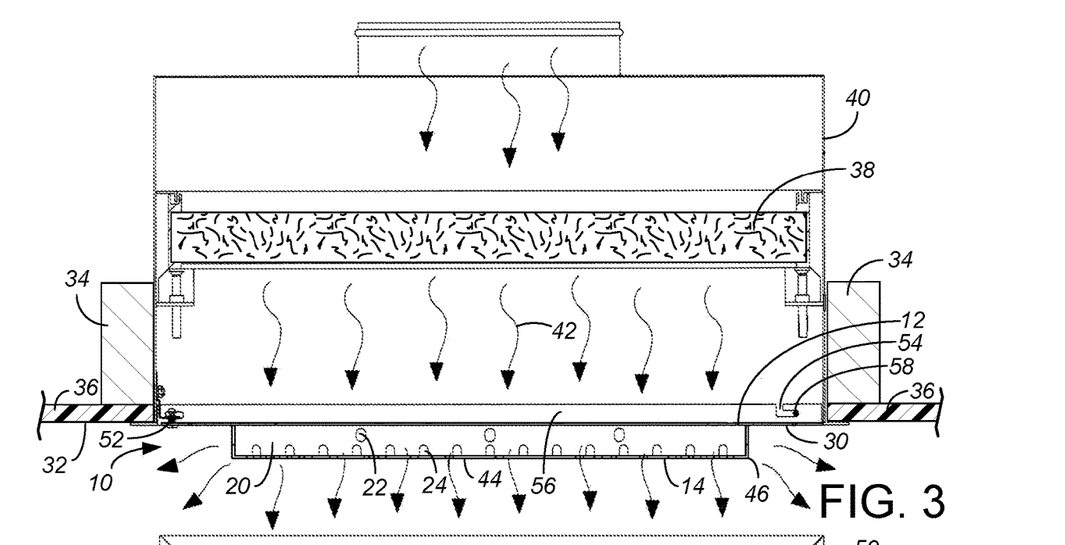
FIG. 3 is a cross-sectional side view of the air flow diffuser of FIGS. 1 and 2, but depicting two alternative mounting systems, as installed relative to an air filter and ceiling in a room, taken along lines 3-3 in FIG. 4.

The diffuser 10 is used where an air flow duct enters a room of a building, such as on a ceiling, wall or floor of a room. Because most ceilings, walls and floors are planar, the preferred air flow diffusers 10 also have an overall planar construction. The plan size of the diffuser 10 is in accordance with the size of the duct/opening where air enters the room. The preferred diffuser 10 of FIGS. 1-6 is square, such as covering a nominally 2'×2' area. In most installations, the nominally 2'×2' area is somewhere in the range of 20"×20" up to 23.5"×23.5". This size of duct opening is quite common in North American ceilings, and FIG. 3 depicts the preferred diffuser 10 mounted in a ceiling 32. The ceiling 32, in the example shown in FIG. 3, includes joists 34 on 2' spacing which define sides of the square duct opening. The ceiling 32, in the example shown in FIG. 3, also includes sheet material 36 hung on the joists 34. While the cross-sections shown in FIG. 3 cross-hatch the joists 34 as metal and the sheet material 36 as plastic, the diffuser 10 of the present invention can be used with ceilings, walls and floors of virtually any building material(s), at whatever size, shape and location of such building materials is used for air entry through a duct into the room.

In the installation location example shown in FIG. 3, air enters the room through an air filter 38 which is mounted in a housing 40 relative to the diffuser 10, such as a HEPA (high efficiency particulate air) filter 38, with the diffuser 10 supported from the air filter housing 40. The size of the HEPA filter can be square or rectangular, up to certain size and aspect ratio limits, yet the arrangement of the diffuser 10 including the mask plate 12 maintains the output flow in the desired umbrella pattern. Without the mask plate 12, the output flow would have greatly increased (possibly unacceptable) pattern variation with different sizes and shapes of HEPA filter.

Other common mounting locations for the diffuser 10 are adjacent and downstream of a fan powered unit (not shown) or a hood (not shown). Alternatively the diffuser 10 could be mounted from an HVAC duct. In any of these arrangements, the diffuser 10 could be integrally made or potted with the air filter/fan/hood/duct housing 40. The diffuser 10 could also be mounted directly from the ceiling 32, wall or floor building materials. The orifice plate 14 and mask plate 12 can be affixed to the housing 40 or building materials 34, 36 in any convenient mounting arrangement as known in the art. In all these arrangements, the mask plate 12 can help to produce a desired umbrella-shaped output pattern, even if the cubic feet per minute flow rate through the diffuser 10 varies within a large range, and even if the velocity profile of air entering the diffuser 10 is not uniform and laminar.

The general purpose of the diffuser 10 is to control the air flow as it enters the room, depicted with arrows 42 in FIG. 3. The combination of the mask plate 12 and the orifice plate 14, particularly including the unique orifice pattern in the orifice plate 14, create a smoother, umbrella shaped flow pattern of air projected through the diffuser 10 into the room. In the most preferred installation layout, the mask plate 12 is generally coplanar with the face of the ceiling 32, wall or floor, with the orifice plate 14 projecting into the room by a distance generally equal to the amount of the separation between the mask plate 12 and the orifice plate 14. The diffuser 10 could alternatively be installed with the mask plate 12 slightly spaced from the plane defined by the face of the ceiling 32, wall or floor, particularly if flaring (not shown) is used to ease the air flow transition between the plane of the mask plate 12 and the room face plane.

The diffuser 10 directs and spreads the air along the ceiling 32 while simultaneously creating a generally uniform downward flow. This umbrella shaped flow pattern is particularly important in clean room operations, where the obtained flow pattern includes essentially no upward air flow locations, but rather produces an umbrella shaped air flow with its central axis matching the central axis of the central zones of the perforated diffuser plate 14. The umbrella shaped air flow pattern has essentially no dead zones, no updrafts, no swirling, and minimal air turbulence in the room, improving on all the prior art designs. The umbrella shaped air flow pattern helps to better trap any released airborne contamination in a downward direction.

The peripheral flange 30 of the preferred perforated diffuser plate 14 is spaced from the perforated face 44 by an axial spacing in the range of 0.125 to about 3 inches, and more preferably in the range of 0.125 to 1.25 inches, with a most preferred spacing depicted in FIGS. 1-6 of about 1.25 inches. Other most preferred values for axial spacing are 0.375 inches and 0.5 inches. As shown in FIGS. 1 and 3, the peripheral flange 30 can abut the mask plate 12 to achieve the axial spacing corresponding with the axial length of the peripheral wall 20. In use, the mask together with the perforated diffuser plate 14 define an airflow cavity that is slightly less than the axial spacing dimension deep (depending upon the thickness of material selected for the perforated diffuser plate 14) in the general direction of air flow. In the preferred embodiments, both the perforated diffuser plate 14 and the mask plate 12 are formed from a relatively thin (for reduced weight) rigid sheet material, such as stainless steel, cold rolled steel or aluminum, and at an appropriate thickness, such as 20, 22 or 24 gauge (if steel) or about $\frac{1}{16}^{th}$ inch (if aluminum). Alternative embodiments might use other materials, including having the mask plate 12 and the orifice plate 14 formed of a molded polymer, or even having the mask plate 12 or the central area 44 of the orifice plate 14 formed of a flexible film or cloth material. In all embodiments, the important consideration is how air flows through the mask plate 12 and the orifice plate 14 and how air moves in the gap between the mask plate 12 and the orifice plate 14.

As best shown in FIGS. 1, 2, and 4-6, the orifice plate 14 includes a unique perforation pattern characterized by one or more central zones C1, C2. The openings 18 in the central zones C1, C2 do not have a rectangular or hexagonal perforation pattern, but rather have a layout which is at least in significant part circular or ovular. In particular, the layout of openings 18 in the central zones C1, C2 are such that the openings 18 do not form a significant line of openings in any direction, i.e., the openings 18 in the central zones C1, C2 are not aligned either north-south, east-west, or in any other linear direction, including not having an identifiable radial alignment.

In the preferred embodiment shown, there are two central circular zones (called out as zones C1 and C2 on FIG. 6), with the layout of perforations 18 being in entirely circular rings in these zones C1, C2. In the preferred embodiment, the perforations 18 of zone C1 provide less opening density than the perforations 18 of zone C2. In zone C1, the perforation holes 18 are centered on circular rings of ½ inch spacing. For instance, the preferred embodiment depicted has a single 0.285 inch diameter hole 18 at the central axis, with the first ring of holes 18 including four 0.285 inch diameter circular holes 18 equally spaced (i.e., centers are each 90° apart) on a circular ring of 1.5 inches in diameter. The second ring of holes 18 includes three 0.285 inch diameter holes 18 nearly equally spaced (i.e., centers are each 120° apart) on a circular ring of 2 inches in diameter, with a slight adjustment made so none of the second ring holes 18 are too close to the four holes 18 of the first ring. The third ring of holes 18 includes five 0.285 inch diameter holes 18 equally spaced (i.e., centers are each 72° apart) on a circular ring of 2.5 inches in diameter. As can be seen by analyzing the hole layout of FIGS. 4 and 5, the number of holes 18 on the even-inch diameter rings (i.e., 2, 3, 4, 5, 6 and 7 inch diameter rings) in zone C1 is generally significantly less than the number of holes 18 on the half-inch diameter rings in zone C1, thereby achieving the overall density desired in zone C1 while maintaining spacing between adjacent holes 18 as much as possible, and while minimizing any sort of radial patterning.

Figure 6:
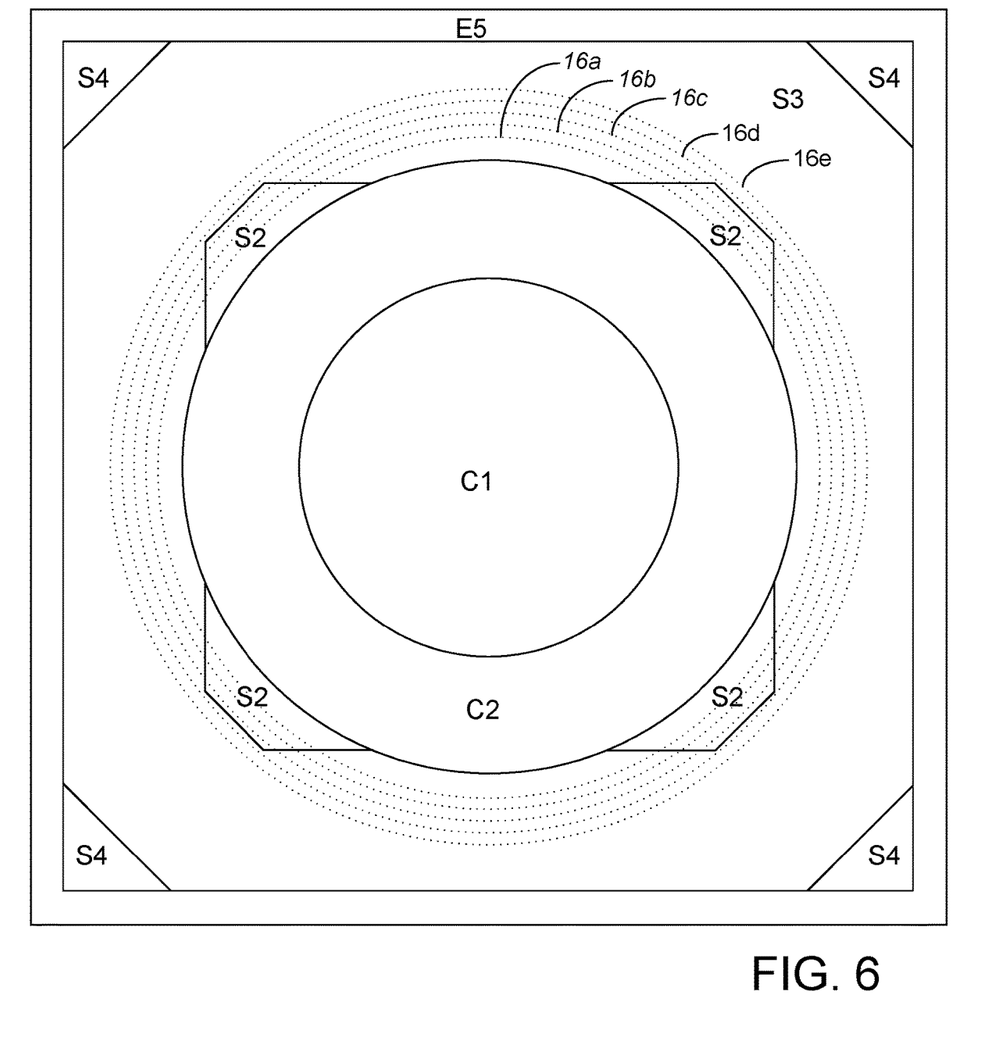
FIG. 6 is a schematic view used to explain the layout of orifices in the orifice plate and mask plate in the air flow diffuser of FIGS. 1-5.

In zone C2, the orifices 18 are centered on circular rings of 1 inch spacing, with the number of holes 18 in each ring selected to have a generally consistent density while minimizing radial patterning. The perforations 18 are continued to be laid out through zones C1 and C2 in rings of increasing diameters, with different numbers of holes 18 per ring, to a final outer ring diameter of 12.5 inch in diameter which includes forty-one 0.307 inch diameter holes 18. With larger diameter holes 18 and greater hole density, zone C2 has more holes 18 per unit area than zone C1, such as having at least 20% more holes 18 per unit area. In the preferred embodiment, zone C1 has a density of 82 holes 18/8 inch diameter= just over 10% open, while zone C2 has a density of 172 holes 18/about 82 in$^2$=almost 20% open, i.e., nearly 100% more holes 18 per unit area.

The preferred perforated orifice plate 14 includes one or more outer orifice layouts. These outer orifice layouts are situated substantially as taught in the '617 patent, to transfer air into a more rectangular pattern (which generally will better match the rectangular shape of the room in which the diffuser 10 is used) and to create the desired air flow across the surface of the ceiling 32, wall or floor in which the diffuser 10 is mounted. In contrast to the circular, non-linear pattern of the orifices 18 in zones C1 and C2, these outer orifice layouts utilize holes 18 which have a standard linear grid. In the embodiment depicted, the outer orifice layout is a square close pack in lines spaced 0.5 inches apart in both the N-S and E-W direction (i.e., in the vertical and horizontal directions as laid out on the drawing page), but a rectangular close pack or a hexagonal close pack are also convenient options for the orifice layout in the outer zone(s). The most preferred outer orifice layout includes a zone S2, generally having the same orifice density as zone C2, but beginning the transition from circular to square. Zones S3 and S4 are situated substantially as taught in the '617 patent. Zones S3 and S4 have a greater density of openings 18 than in the central zone(s) C1, C2 and S2, with zone S4 having the greatest density of openings 18, and with both zones S3 and S4 generally laid out in a rectangular close pack arrangement. For instance, zone S3 preferably has at least 20% more open space per unit area than zones C2/S2, and zone S4 preferably has at least 20% more open space per unit area than zone S3. In the preferred embodiment, zone S3 has a density of over 32% open (i.e., about 60% more open space per unit area than zone S2), while zone S4 has a density of almost 52% open space (i.e., about 60% more open space per unit area than zone S3).

Figure 4:
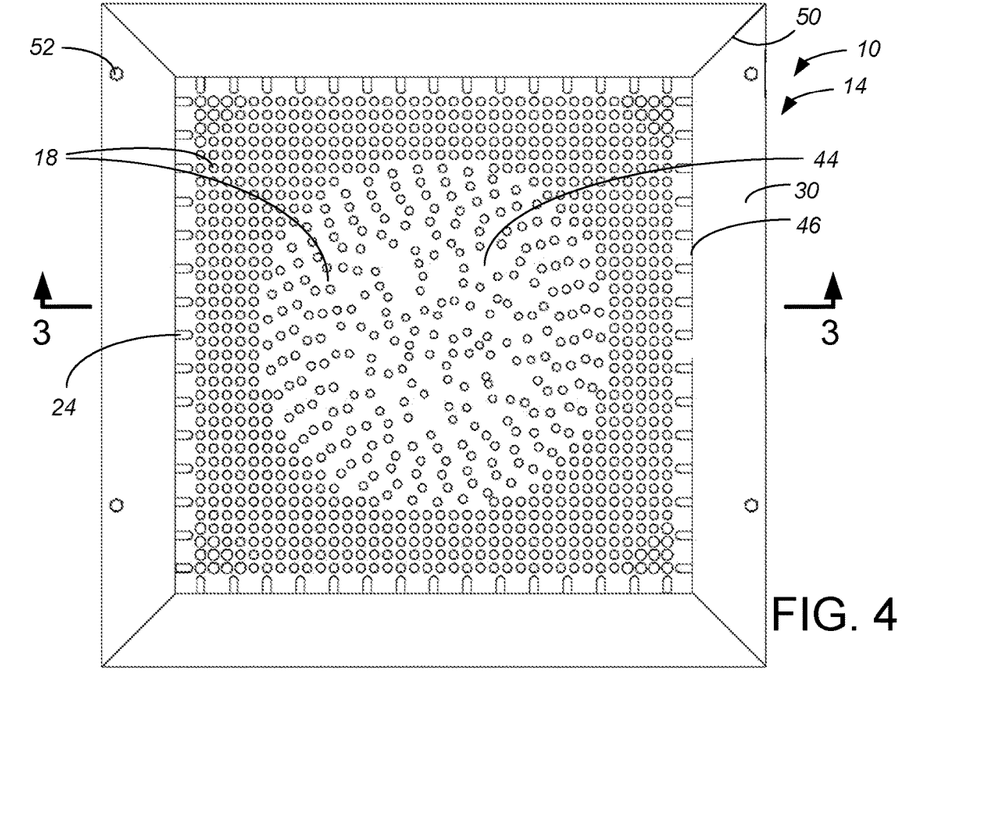
FIG. 4 is a bottom plan view of the air flow diffuser of FIG. 3, formed with an alternative manufacturing method.
Figure 5:
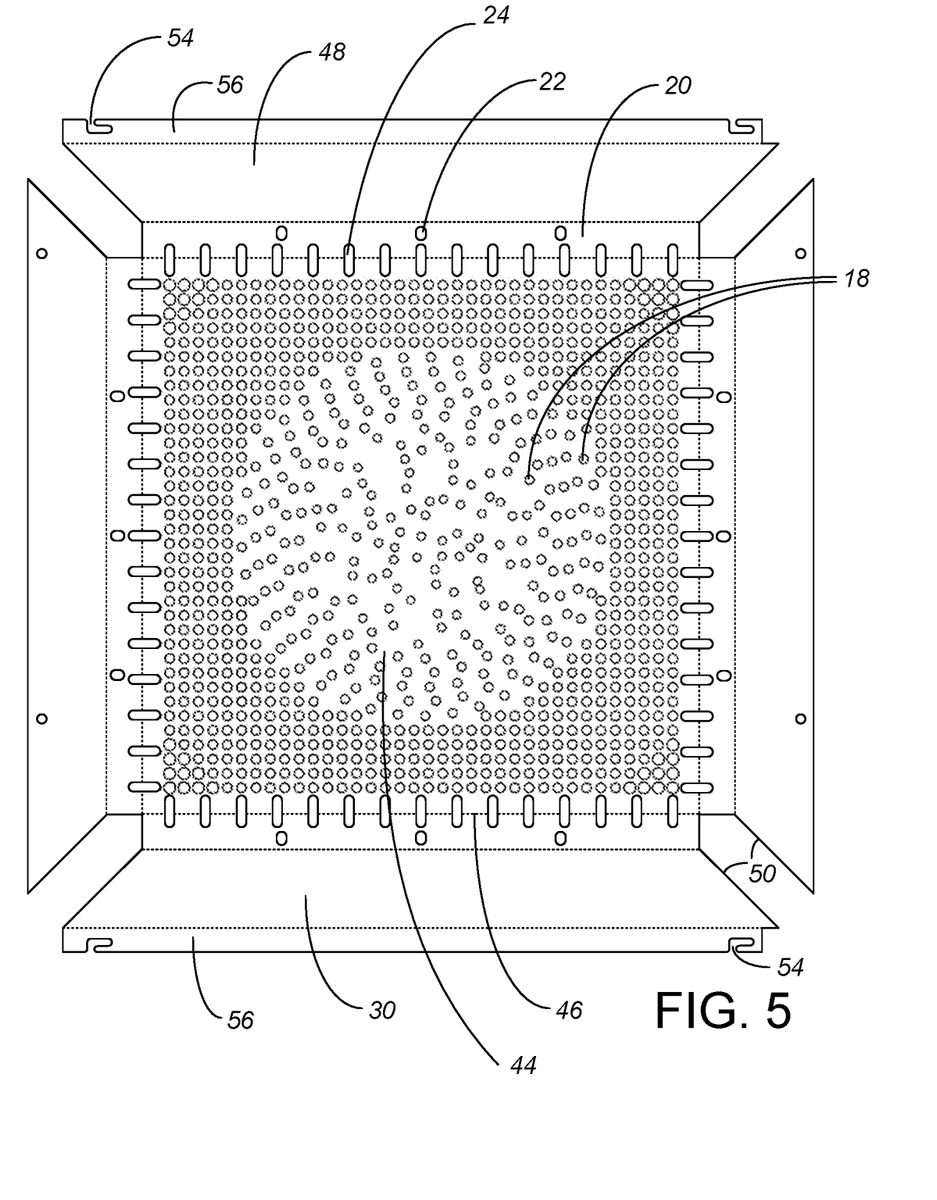
FIG. 5 is a plan view of a blank used to make the orifice plate of the air flow diffuser of FIGS. 3-4.

The preferred perforated diffuser plate 14 as includes a fifth outer zone E5 which includes slots 24 along the bend 46 in the sheet material and extending into the side or edge faces 20 as shown in FIGS. 3 and 5. This fifth outer zone E5 is optional, but assists in generating better air flow along the ceiling 32 when the diffuser 10 is used in a ceiling 32. As noted above, different preferred embodiments differ in how far the orifice plate 14 is spaced from the mask plate 12 and/or how far the face 44 defining the planar central zone(s) C1, C2 of the orifice plate 14 extends into the room. As the spacing from the mask plate 12/distance of protrusion into the room shortens, the percentage of open area in the sidewalls 30 should be increased. With the preferred embodiment shown in FIGS. 1-6 having the perforated face 44 being spaced 1.25 inches from the mask plate 12 and mounted to extend 1.25 inches into the room, a low value, such as having the open area of the edge 20 and the zone E5 be about 15%. This is created by the combination of 15 corner slots 24 per side together with 3 smaller slots 24 adjacent the peripheral flange 30. The embodiments spaced 0.5 inches from the mask plate 12 can increase the number of smaller slots 24, such as to 11 smaller slots 24. The embodiments with the perforated face 44 spaced 0.375 and 0.125 inches from the mask plate 12 can further increase the number of smaller slots 24 or enlarge the width of the smaller slots 24, though obviously the openings 24 on the side 20 must be modified in shape to fit within the smaller surface area on the side.

Thus, in the most preferred embodiment, the holes 18 are as follows:

| Zone in FIG. 6 | Ring diameter (in.) | # holes | Hole diameter (in.) |
|---|---|---|---|
| C1 | 0 | 1 | 0.285 |
| C1 | 1.5 | 5 | 0.285 |
| C1 | 2 | 3 | 0.285 |
| C1 | 2.5 | 5 | 0.285 |
| C1 | 3 | 3 | 0.285 |
| C1 | 3.5 | 6 | 0.285 |
| C1 | 4 | 3 | 0.285 |
| C1 | 4.5 | 9 | 0.285 |
| C1 | 5 | 3 | 0.285 |
| C1 | 5.5 | 10 | 0.285 |
| C1 | 6 | 4 | 0.285 |
| C1 | 6.5 | 12 | 0.285 |
| C1 | 7 | 4 | 0.285 |
| C1 | 7.5 | 14 | 0.285 |
| C2 | 8.5 | 28 | 0.307 |
| C2 | 9.5 | 31 | 0.307 |
| C2 | 10.5 | 34 | 0.307 |
| C2 | 11.5 | 38 | 0.307 |
| C2 | 12.5 | 41 | 0.307 |
| S2 | — | 12 × 4 = 48 | 0.307 (28% OA) |
| S3 | — | 660 | 0.328 (32% OA) |
| S4 | — | 10 × 4 = 40 | 0.406 (52% OA) |

-continued

| Zone in FIG. 6 | Ring diameter (in.) | # holes | Hole diameter (in.) |
|---|---|---|---|
| E5 | — | (15 corner slots + 3 side slots) × 4 = 72 | .312 × 1.131 .375 × 0.5 (15% OA) |

In the preferred embodiment shown in FIGS. 1 and 2, the orifice plate 14 is formed by deep drawing sheet material or by molding to produce the peripheral wall 20. In the preferred embodiment shown in FIGS. 3 and 4, the orifice plate 14 is formed by stamping sheet material into the blank 48 of sheet material shown in FIG. 5. In the peripheral flange 30, edges 50 of the blank 48 are tack welded together to provide aesthetically pleasing mitered corners. For aesthetic reasons, any discoloration or bluing on the room side caused by the tack welding can be removed by grinding.

In the preferred embodiment shown in FIGS. 3 and 4, two alternative mounting arrangements are depicted rather than using the wing nuts 28 of FIGS. 1 and 2. One mounting arrangement, shown on the left side of FIG. 3 and in FIG. 4, involves using axially oriented machine screws 52 through the peripheral flange 30. An alternative mounting arrangement, shown on the right side of FIG. 3, involves forming slots 54 in a hanging strip 56 of the blank 48, and then hanging the orifice plate 14 from pegs 58 provided in the filter housing 40. Any other mounting arrangements known in the art can alternatively be used, for mounting both the orifice plate 14 and the mask plate 12 with the desired axial spacing relative to the air duct or air flow control device.

Figure 7:
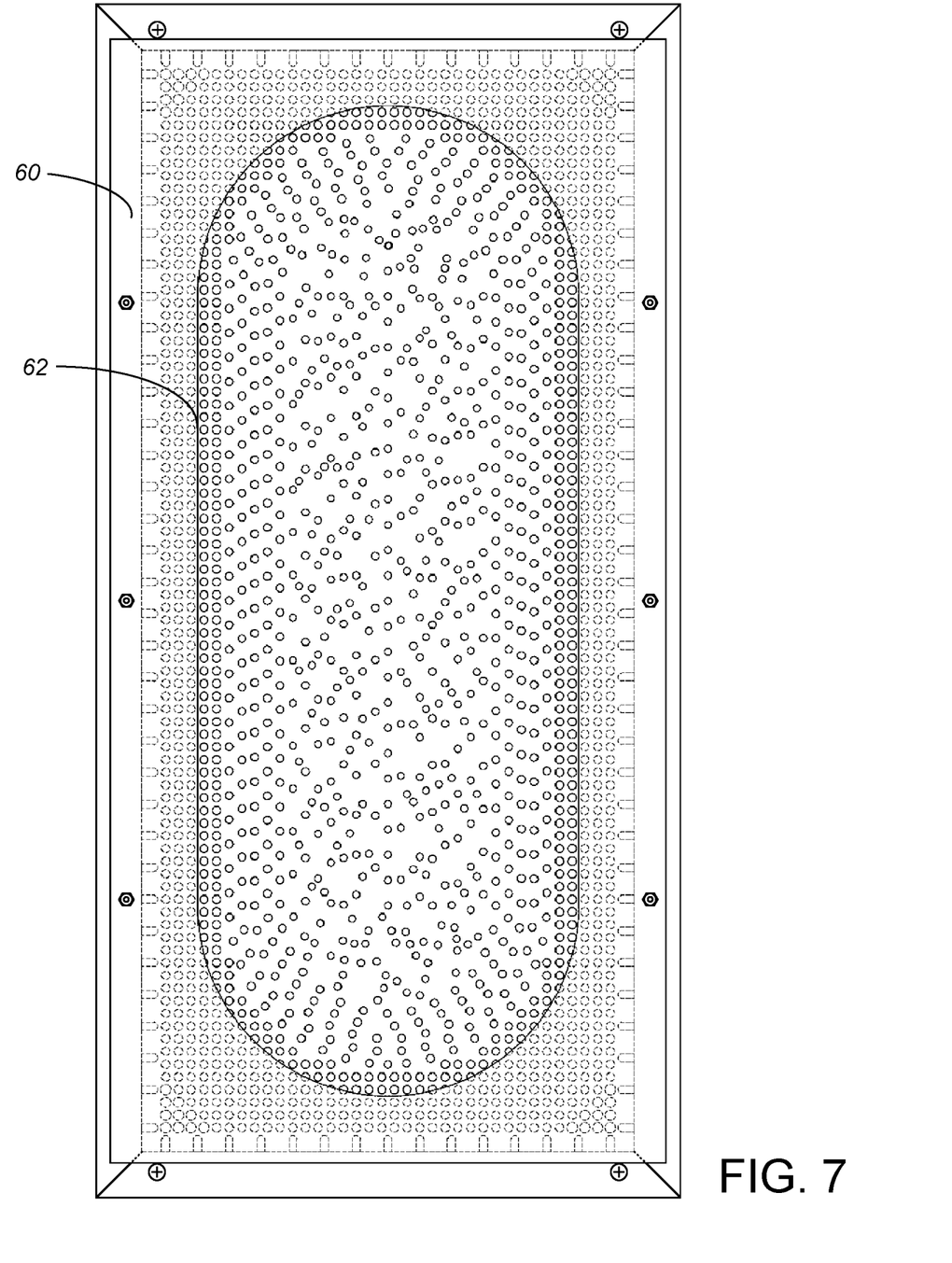
FIG. 7 is a top plan view of a second preferred embodiment of an air flow diffuser in accordance with the present invention, this one covering a 4'×4' area.
Figure 8:
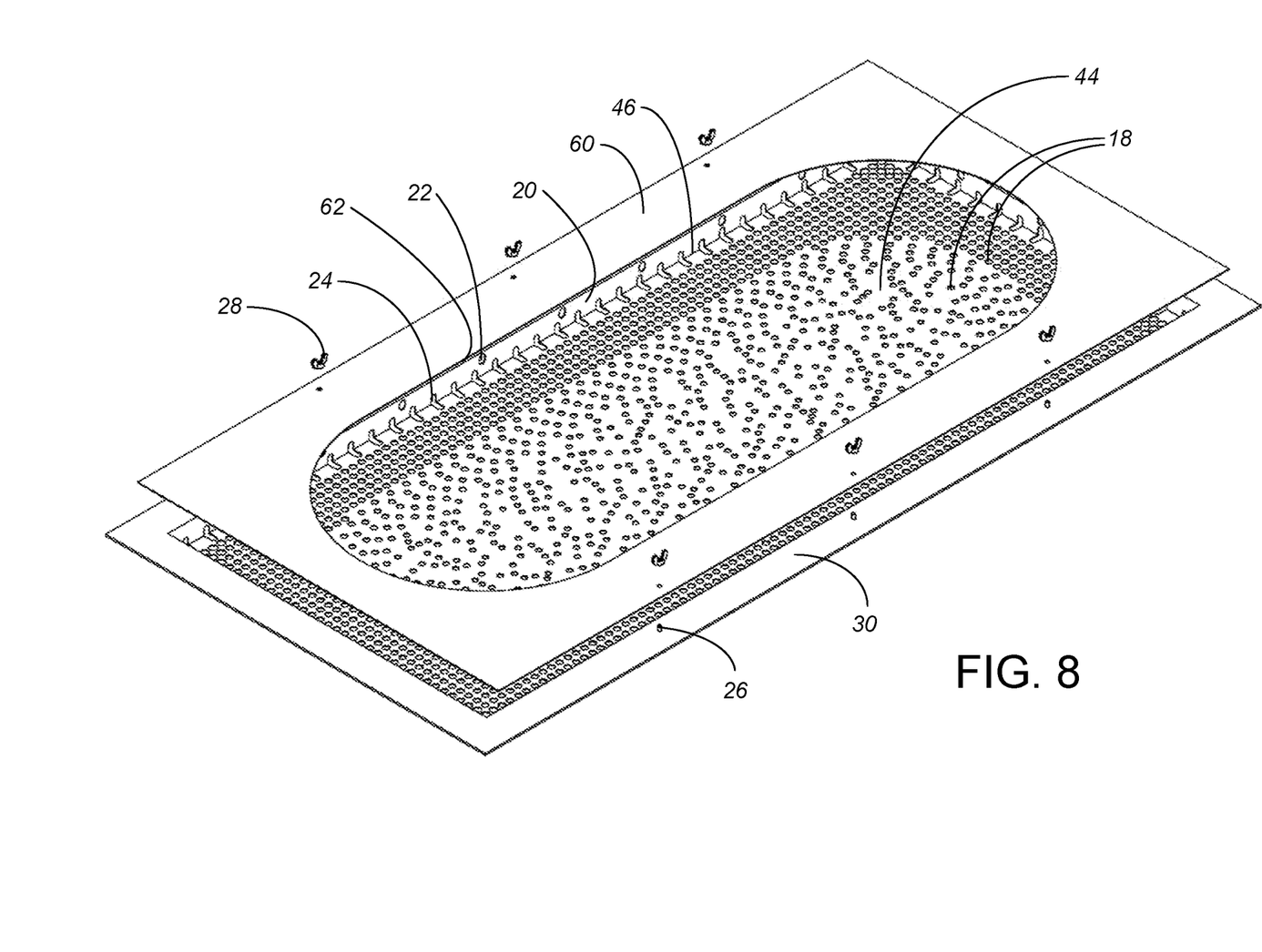
FIG. 8 is an exploded perspective view, from above, of the air flow diffuser of FIG. 7.

An alternative embodiment, shown in FIGS. 7 and 8, is for use openings/air supplies which are not square but are longer than they are wide (such as a nominal 2 ft.×4 ft. diffuser). As shown in FIGS. 7 and 8, this design has the layout of perforations 18 in the central zone(s) being in a concentric series of race track shapes.

As noted, the orifice plate 14 is used in a spaced relationship relative to a mask plate 12. The mask plate 12 has a central opening 16 which is larger than the central zone(s) C1, C2 and smaller than the outer zone(s) S3, S4 of the orifice plate 14. The inside edge of the mask plate 12 preferably has a curvature which centers the air flow without corners. Thus, for instance, the inside edge 16 of the mask plate 12 shown in FIGS. 1 and 2 is circular, which the inside edge 62 of the mask plate 60 shown in FIG. 7 is a racetrack type of oval shape.

In some embodiments, the orifice plate 14 can be used with any of several mask plates each having a different size of central opening 16. For instance, several different mask plates can be provided with a single orifice plate 14 as a kit, in which the user selects which mask plate to use to create the desired umbrella pattern. One such kit includes five different mask plates, differing between a diameter of central circular opening of 14, 14.5, 15, 15.5 and 16 inches, provided in a kit with the depicted orifice plate 14 have 12.5 inch diameter central zone(s). Thus, the five available mask plate openings 16a, 16b, 16c, 16d, 16e are shown with dashed lines in FIG. 6. The smaller the central circular opening 16 in the mask plate 12, the more the resulting flow is along the ceiling 32. Having several different mask plates 12 to choose from with one style of perforated diffuser plate 14 allows the flow through the diffuser plate 14 to be better customized for the particular size of room that the diffuser 10 will be used in.

The present invention has been found to work very well in creating the umbrella shaped air flow pattern and minimizing updrafts, swirling, turbulence and deadzones over a wide range of different air flows from 200 to 700 cfm, and is believed to effectively diffuse over wider ranges such as 150 to 800 cfm in a 2×2 ft. diffuser 10.

The preferred embodiment could be formed by drilling or laser cutting the openings 18 in the perforated diffuser plate 14, but more preferably is formed by stamping. The preferred openings 18 through the perforated diffuser plate 14 are circular, but could have any other shape to provide the desired amount of open area in each zone. Similarly, the number of openings 18 in each zone is not as significant as the amount of open area in each zone, provided the central zones do not align radially as would be the case in a close pack arrangement. The number of zones within the central zones and the outer zones is not particularly significant and could readily be increased, provided the general increasing-open-area-as-distance-away-from-central-axis-increases (i.e., umbrella) profile is maintained.

Although the present invention has been described with reference to preferred embodiments, workers skilled in the art will recognize that changes may be made in form and detail without departing from the spirit and scope of the invention. For example, all the dimensions provided herein are exemplary only unless specified in the particular claim, and can be varied for the particular system in which the air diffuser of the present invention is used.

What is claimed is:

1. An air diffuser for controlling or affecting flow of air from a duct into a room of a building, the air diffuser comprising:
    a housing having walls defining an internal space with a rectangular cross-section, arranged such that air flow from the duct through the housing within the internal space establishes an airflow direction perpendicular to the rectangular cross-section;
    a mask plate supported by the walls of the housing downstream of the internal space and at an exit from the housing, the mask plate extending transversely to the airflow direction so as to restrict an outer portion of the air flow, the mask plate having at least one air flow opening defined therein which concentrates the air flow therethrough as the air flow exits the housing; and
    an orifice plate disposed transversely to the airflow direction and spaced from the mask plate by a plate spacing distance, thus defining a separation space between the mask plate and the orifice plate, which separation space creates an outward, generally radial flow of air once downstream beyond edges of the mask plate air flow opening, with a spreading axial flow of air downstream of the mask plate within a footprint of the air flow opening, the orifice plate having a first zone with a plurality of orifice plate openings defined within the footprint of the mask plate air flow opening at a first zone density; the orifice plate having a second zone with a plurality of orifice plate openings defined outside the footprint of the mask plate air flow opening at a second zone density, wherein the first zone density is different from the second zone density; and
    a peripheral wall, angled relative to the mask plate and orifice plate and extending from the mask plate to the orifice plate, with a plurality of peripheral wall openings defined therein, the peripheral wall openings receiving the radial flow of air;

such that exiting airflow through the first zone, the second zone and the peripheral wall openings jointly has an umbrella-shaped output pattern of airflow into the room, wherein the housing defines an opening for the duct on a side opposite the orifice plate, and wherein the mask plate is separated from the orifice plate by a distance of 0.125 to 1.25 inches;

wherein the air diffuser is installed relative to a wall or ceiling of a room in a building, wherein the wall or ceiling define a planar mounting surface, with the housing extending into the wall or ceiling, and wherein the mask plate is generally co-planar with the planar mounting surface.

2. The air diffuser of claim 1, wherein the air flow opening through the mask plate is circular, wherein the air flow opening has an air flow opening diameter at least half the width of the rectangular cross-section internal space, and wherein the orifice plate is rectangular.

3. The air diffuser of claim 2, wherein the peripheral wall comprises four side walls, with a plurality of peripheral wall openings defined in each of the four side walls.

4. The air diffuser of claim 2, wherein the orifice plate openings defined within the footprint of the mask plate air flow opening are arranged in a non-linear pattern, and wherein the orifice plate openings defined outside the footprint of the mask plate air flow opening are arranged in a linear pattern.

5. The air diffuser of claim 4, wherein the orifice plate openings defined outside the footprint of the mask plate air flow opening further comprise a third zone with a plurality of orifice plate openings defined therein at a third zone density, the third zone covering corners of the orifice plate, wherein the second zone density is greater than the first zone density, and wherein the third zone density is greater than the second zone density.

6. The air diffuser of claim 1, wherein at least some of the peripheral wall openings join with at least some of the orifice plate openings of the second zone.

7. The air diffuser of claim 1, wherein the peripheral wall and the orifice plate are jointly formed from a single sheet of material, and wherein the peripheral wall contacts the mask plate.

8. The air diffuser of claim 1, wherein the peripheral wall openings have a peripheral wall density which is different from the first zone density and different from the second zone density.

9. An air diffuser for controlling or affecting flow of air from a duct into a room of a building, the air diffuser comprising:
　a housing having walls defining an internal space with a rectangular cross-section, arranged such that air flow from the duct through the housing within the internal space establishes an airflow direction perpendicular to the rectangular cross-section;
　a mask plate supported by the walls of the housing downstream of the internal space and at an exit from the housing, the mask plate extending transversely to the airflow direction so as to restrict an outer portion of the air flow, the mask plate having at least one air flow opening defined therein which concentrates the air flow there through as the air flow exits the housing; and
　an orifice plate disposed transversely to the airflow direction and spaced from the mask plate by a plate spacing distance, thus defining a separation space between the mask plate and the orifice plate, which separation space creates an outward, generally radial flow of air once downstream beyond edges of the mask plate air flow opening, with a spreading axial flow of air downstream of the mask plate within a footprint of the air flow opening, the orifice plate having a first zone with a plurality of orifice plate openings defined within the footprint of the mask plate air flow opening at a first zone density; the orifice plate having a second zone with a plurality of orifice plate openings defined outside the footprint of the mask plate air flow opening at a second zone density, wherein the first zone density is different from the second zone density;
　a peripheral wall, angled relative to the mask plate and orifice plate and extending from the mask plate to the orifice plate, with a plurality of peripheral wall openings defined therein, the peripheral wall openings receiving the radial flow of air;
　such that exiting airflow through the first zone, the second zone and the peripheral wall openings jointly has an umbrella-shaped output pattern of airflow into the room;
　an air filter within the housing, the air filter running parallel to the mask plate and the orifice plate, with the airflow direction moving perpendicularly through the air filter; and
　wherein the housing defines an opening for the duct on a side opposite the orifice plate, and wherein the mask plate is separated from the orifice plate by a distance of 0.125 to 1.25 inches.

10. An air diffuser for controlling or affecting flow of air from a duct into a room of a building, the air diffuser comprising:
　a housing having walls defining an internal space with a rectangular cross-section, arranged such that air flow from the duct through the housing within the internal space establishes an airflow direction perpendicular to the rectangular cross-section;
　an orifice plate supported from the housing downstream from the internal space and having a first zone with a plurality of orifice plate openings at a first zone density arranged in a non-linear pattern, the orifice plate having a second zone with a plurality of orifice plate openings at a second zone density defined outside the first zone and arranged in a linear pattern; and
　a mask plate supported at an airflow exit from the housing downstream from the internal space and spaced upstream from the orifice plate by a plate spacing distance thus defining a separation space between the mask plate and the orifice plate, the mask plate having at least one air flow opening defined therein which concentrates the air flow therethrough, with the mask plate restricting an outer portion of the air flow exiting through the housing and into the room, the separation space creating an outward, generally radial flow of air once downstream beyond edges of the mask plate air flow opening, with a spreading axial flow of air downstream of the mask plate within a footprint of the air flow opening, wherein the first zone is within the footprint of the air flow opening of the mask plate and the second zone is outside a footprint of the air flow opening of the mask plate;
　wherein the housing defines an opening for the duct on a side opposite the orifice plate, and wherein the mask plate is separated from the orifice plate by a distance of 0.125 to 1.25 inches;
　the air diffuser further comprising an air filter within the housing upstream from the internal space, the air filter running parallel to the orifice plate, with the airflow direction moving generally perpendicularly through the air filter, with nothing impeding airflow between the air filter and the air flow opening of the mask plate.

11. The air diffuser of claim 10, further comprising:
a peripheral wall, angled relative to the orifice plate, with a plurality of peripheral wall openings defined therein.

12. The air diffuser of claim 11, wherein the orifice plate is rectangular, and wherein the air flow opening of the mask plate has a curved edge, wherein the air flow opening has an air flow opening diameter at least half of a width of the rectangular cross-section internal space.

* * * * *